(12) United States Patent
Hohner et al.

(10) Patent No.: US 9,765,715 B2
(45) Date of Patent: Sep. 19, 2017

(54) METHOD FOR OPERATING AN EXHAUST GAS PURIFICATION SYSTEM OF AN INTERNAL COMBUSTION ENGINE

(71) Applicant: Daimler AG, Stuttgart (DE)

(72) Inventors: Peter Hohner, Stuttgart (DE); Carsten Zeller, Kornwestheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/036,329

(22) PCT Filed: Oct. 25, 2014

(86) PCT No.: PCT/EP2014/002885
§ 371 (c)(1),
(2) Date: May 12, 2016

(87) PCT Pub. No.: WO2015/070950
PCT Pub. Date: May 21, 2015

(65) Prior Publication Data
US 2016/0290262 A1 Oct. 6, 2016

(30) Foreign Application Priority Data
Nov. 13, 2013 (DE) .................. 10 2013 019 025

(51) Int. Cl.
*F02D 41/02* (2006.01)
*F01N 3/08* (2006.01)
(Continued)

(52) U.S. Cl.
CPC ....... *F02D 41/0275* (2013.01); *F01N 3/0842* (2013.01); *F01N 3/2073* (2013.01);
(Continued)

(58) Field of Classification Search
CPC ........ F01N 3/0842; F01N 9/00; F01N 11/007; F01N 13/009; F02D 41/0275; F02D 41/1441
(Continued)

(56) References Cited

U.S. PATENT DOCUMENTS 6,216,449 B1* 4/2001 Strehlau ............ B01D 53/9495
60/274
2001/0054282 A1* 12/2001 Lang .................. B01D 53/9495
60/277
(Continued)

FOREIGN PATENT DOCUMENTS

DE 198 16 175 A1 10/1999
DE 100 17 940 A1 10/2001
(Continued)

OTHER PUBLICATIONS

German Search Report issued in German counterpart application No. 10 2013 019 025.8 dated Jun. 24, 2014 (Nine (9) pages).
(Continued)

*Primary Examiner* — Jason Shanske
(74) *Attorney, Agent, or Firm* — Crowell & Moring LLP (57) ABSTRACT

A method for operating an exhaust gas purification system of an internal combustion engine, which can be operated in a lean operating mode and in a rich operating mode, is disclosed. The exhaust gas purification system has, arranged one after the other in the direction of flow of the exhaust gas, an ammonia-forming catalyst, a first exhaust gas sensor, an ammonia-SCR catalyst, a nitrogen oxide storage catalyst and a second exhaust gas sensor. Exhaust gas sensors emit a first signal correlating with the nitrogen oxide content of the exhaust gas and a second signal correlating with the lambda value of the exhaust gas. In diagnostic operation, the ammonia storage capacity of the ammonia-SCR catalyst and the oxygen and optionally the nitrogen oxide storage capac-
(Continued)

ity of the nitrogen oxide storage catalyst can be determined by analyzing the signals of the first and second exhaust gas sensors.

9 Claims, 2 Drawing Sheets

(51) Int. Cl.
    *F01N 3/20*     (2006.01)
    *F01N 9/00*     (2006.01)
    *F01N 11/00*     (2006.01)
    *F01N 13/00*     (2010.01)
    *F02D 41/14*     (2006.01)

(52) U.S. Cl.
    CPC .............. *F01N 9/00* (2013.01); *F01N 11/007* (2013.01); *F01N 13/009* (2014.06); *F02D 41/146* (2013.01); *F02D 41/1441* (2013.01); *F02D 41/1475* (2013.01); *F01N 2240/25* (2013.01); *F01N 2430/06* (2013.01); *F01N 2550/03* (2013.01); *F01N 2560/025* (2013.01); *F01N 2560/026* (2013.01); *F01N 2560/14* (2013.01); *F01N 2900/1622* (2013.01); *F01N 2900/1624* (2013.01); *F02D 2041/1468* (2013.01); *F02D 2200/0808* (2013.01); *F02D 2200/0816* (2013.01); *Y02T 10/24* (2013.01); *Y02T 10/47* (2013.01)

(58) Field of Classification Search
    USPC .......................................................... 60/274
    See application file for complete search history.

(56) References Cited

U.S. PATENT DOCUMENTS

| | | |
|---|---|---|
| 2004/0076565 A1 | 4/2004 | Gandhi et al. |
| 2010/0043402 A1 | 2/2010 | Perry et al. |
| 2010/0326051 A1* | 12/2010 | Busch .................... F01N 3/208 60/274 |

FOREIGN PATENT DOCUMENTS

| | | |
|---|---|---|
| DE | 10 2007 040 439 A1 | 3/2009 |
| DE | 10 2008 027 575 A1 | 12/2009 |
| DE | 10 2009 054 046 A1 | 9/2010 |
| EP | 0 878 609 A2 | 11/1998 |

OTHER PUBLICATIONS

PCT/EP2014/002885, International Search Report (PCT/ISA/210) dated Jan. 22, 2015, with partial English translation, enclosing Written Opinion of the International Searching Authority (PCT/ISA/237) (Eleven (11) pages).

* cited by examiner

METHOD FOR OPERATING AN EXHAUST GAS PURIFICATION SYSTEM OF AN INTERNAL COMBUSTION ENGINE

BACKGROUND AND SUMMARY OF THE INVENTION

The invention relates to a method for operating an exhaust gas purification system of an internal combustion engine that can be operated in a lean operating mode with excess air and in a rich operating mode with a lack of air.

EP 0 878 609 A2 describes an internal combustion engine, which can be operated in a lean operating triode with excess air and in a rich operating mode with a lack of air. In one embodiment, the internal combustion engine has an exhaust gas purification system in which an ammonia-forming catalyst, an ammonia-SCR catalyst baying a storage capacity for ammonia ($NH_3$) and a nitrogen oxide storage catalyst are arranged one after the other in the direction of flow of the exhaust gas. The nitrogen oxide storage catalyst has the property of being able to store nitrogen oxides ($NO_x$) contained in the exhaust gas under lean operating conditions of the internal combustion engine. Under rich operating conditions, nitrogen oxides (NOx) stored in the NOx storage catalyst are reduced by active reducing components present in the exhaust gas, thereby regenerating the NOx storage catalyst. In addition, $NO_x$ present in the exhaust gas is reduced at least partially to $NH_3$ by reaction with the active reducing exhaust gas constituents on the NH3-forming catalyst under rich operating conditions, and the $NH_3$ thereby formed is stored in the downstream NH3-SCR catalyst. If the internal combustion engine is operated in the lean operating mode, then $NO_x$ present in the exhaust gas can be removed from the exhaust gas by reducing it with $NH_3$ stored in the NH3-SCR catalyst as well as by storage in the NOx storage catalyst. In comparison with exclusive use of a NOx storage catalyst, the decrease in $NO_x$ content can be improved in this way.

The object of the invention is to provide a method for operating an exhaust gas purification system of the type defined in the introduction, which will permit the most thorough possible removal of pollutants from the internal combustion engine exhaust gas.

The method according to the invention is used in an exhaust gas purification system for an internal combustion engine that can be operated in a lean operating mode with an air excess and in a rich operating mode with a lack of air. The exhaust gas purification system has a NH3-forming catalyst, which can catalyze at least partial reduction of $NO_x$ contained in the exhaust gas to $NH_3$, a first exhaust gas sensor, a NH3-SCR catalyst with a storage capacity for $NH_3$, a nitrogen oxide storage catalyst directly downstream from the NH3-SCR catalyst, having a storage capacity for oxygen ($O_2$) and a storage capacity for $NO_x$ and a second exhaust gas sensor, these units being arranged one after the other in the direction of flow of the exhaust gas. Exhaust gas sensors capable of emitting a first signal that correlates with a NOx content of the exhaust gas and a second signal that correlates with a lambda value of the exhaust gas are used as the first and second exhaust gas sensors. A lambda value is understood to refer to the ratio of the air supplied to the internal combustion engine and fuel (engine lambda value) with respect to the stoichiometric lambda value of 1.0 and/or the oxidation potential and/or reduction potential of the resulting exhaust gas (exhaust gas lambda value), as is customary. In a diagnostic operation in operating phases of the internal combustion engine with lean operating mode and with rich operating mode that follow one another directly, the $NH_3$ storage capacity of the NH3-SCR catalyst, the oxygen storage capacity (OSC=oxygen storage capacity) of the NOx storage catalyst and optionally the NOx storage capacity of the NOx storage catalyst are determined by analyzing the signals of the first and second exhaust gas sensors. The storage of $O_2$, $NO_x$ and/or $NH_3$ in the catalysts is to be understood as reversible storage. In other words, stored $O_2$, $NO_x$ and/or $NH_3$ can be removed from the catalysts by reaction with the respective exhaust gas components. However, $NH_3$ stored in the NH3-SCR catalyst and $NO_x$ stored in the NOx storage catalyst can typically also be used otherwise, for example, by being thermally desorbed.

The inventors have recognized that to achieve a comprehensive, effective and thorough exhaust gas purification, it is necessary to coordinate the duration of the phases of operation of the internal combustion engine with a lean operating mode and a rich operating mode with the storage properties of the NOx storage catalyst and the NH3-SCR catalyst during alternating operation of the internal combustion engine in the lean operating mode and in the rich operating mode, as is carried out during normal operation. If this is not adequately coordinated, unwanted residual emissions of $NO_x$, HC, CO and $NH_3$ may occur. The inventors of the present invention have recognized in particular that inadequate coordination of the rich operating phase with the $NH_3$ storage capacity of the NH3-SCR catalyst can result in unwanted secondary emissions of nitrous oxide ($N_2O$) pollutant. In other words, if a large amount of $NH_3$ is formed due to a prolonged rich operating phase and is stored in the NH3-SCR catalyst, it may result in leakage of $NH_3$ out of the NH3-SCR catalyst. However, $NH_3$ introduced into the NOx storage catalyst can then be oxidized to $N_2O$ in the NOx storage catalyst. Because of the determination of the $NH_3$ storage capacity of the NH3-SCR catalyst according to the invention as well as the determination of OSC and optionally the NOx storage capacity of the NOx storage catalyst, this permits optimum adaptation of the duration of the rich operating phase and the lean operating phase to the storage properties of the NH3-SCR catalyst and the NOx storage catalyst and thus at least extensive avoidance of the aforementioned secondary emissions.

It has proven to be particularly advantageous to use exhaust gas sensors between the NH3-forming catalyst and the NH3-SCR catalyst and/or downstream from the NOx storage catalyst for determining the storage properties of the NH3-SCR catalyst and the NOx storage catalyst, each of these sensors being able to emit at least one first signal that correlates with a NOx content of the exhaust gas and one second signal that correlates with a lambda value of the exhaust gas. The exhaust gas sensors have measurement cells which can be reached by the exhaust gas and in which the corresponding signals can be generated. Integrated exhaust gas sensors are preferably sensors which can emit a signal correlating with the $NH_3$ content and/or with the $NO_x$ content of the exhaust gas and also a signal correlating with the lambda value of the exhaust gas. However, sensors having a selective sensitivity can also be used for each of the exhaust gas components individually for the first and/or second exhaust gas sensors, but this is not preferred because of the increased equipment complexity. The duration of the respective phase in the lean operating mode and in the rich operating mode is controlled by means of the exhaust gas sensors between the NH3-forming catalyst and the NH3-SCR catalyst as well as downstream from the NOx storage catalyst. To do so, the output signals of the exhaust gas sensors are evaluated by an electronic control unit.

A diagnostic operation with determination of the storage properties of the catalysts, which is typically carried out from time to time, is particularly advantageous because the storage capacity values of the catalysts may undergo changes due to age. If the prevailing storage capacity values have been determined, then the periods of time of the respective phases can be adapted to storage capacity characteristic values of the catalysts, which may optionally have been adapted in the sense of an optimal exhaust gas purification, during the normal alternation of operating phases in the lean operating mode and the rich operating mode. In particular to prevent the formation of nitrous oxide on the NOx storage catalyst, it is advantageous to know the prevailing NH3 storage capacity of the NH3-SCR catalyst and to take it into account because nitrous oxide cannot be detected at all or at least not reliably by means of the second exhaust gas sensor. The duration of operation of the internal combustion engine in the rich operating mode with formation of $NH_3$ on the NH3-forming catalyst can then be determined as a function of the extent of the utilization of the prevailing NH3 storage capacity of the NH3-SCR catalyst.

As has been found, only the OSC of the NOx storage catalyst is a directly determinable storage capacity characteristic value for the serial combination of NH3-SCR catalyst and nitrogen oxide storage catalyst arranged directly following one another when no additional exhaust gas sensor is used between the NH3-SCR catalyst and the NOx storage catalyst, as is preferably provided in the present case. This is due to the fact that the NOx storage catalyst has an OSC but the NH3-SCR catalyst does not. On the other hand, the $NH_3$ storage capacity of the NH3-SCR catalyst and the NOx storage capacity of the NOx storage catalyst cannot be determined directly in such an embodiment of the exhaust gas purification system. This is in turn due to the fact that in general it is impossible to differentiate whether $NO_x$ has been withdrawn from the exhaust gas due to reduction with $NH_3$ stored in the NH3-SCR catalyst or due to storage in the NOx storage material of the NOx storage catalyst. A total value can also be determined for the OSC and the NOx storage capacity of the NOx storage catalyst.

In one embodiment of the invention, it is therefore provided that a first total value for the storage capacity for the OSC and NOx storage capacity of the NOx storage catalyst and a second total value for the NOx storage capacity of the NOx storage catalyst and the NH3 storage capacity of the NH3-SCR catalyst are all determined during diagnostic operation, and the NH3 storage capacity of the NH3-SCR catalyst is determined by calculating the OSC thus determined and the first and second total values for the storage capacity.

OSC and NOx storage capacity indicate how many moles or which mass of $O_2$ and/or $NO_x$ can be stored in the respective storage material of the NOx storage catalyst under the respective conditions. Since half a mole of $O_2$ and one mole of $NO_x$ are necessary to oxidize one mole of CO or $H_2$, OSC and the first total value for the storage capacity can be scaled in CO or $H_2$ equivalents, for example. The first total value for the storage capacity in this case is indicated by the sum of the CO or $H_2$ equivalence of the OSC and the NOx storage capacity of the NOx storage catalyst. The NH3 and NOx storage capacity as well as the second storage capacity total value can each be indicated in $N_2$ equivalence, for example.

It is also provided in another embodiment of the invention that to determine the NOx storage capacity of the NOx storage catalyst in diagnostic operation, a first total value for the storage capacity is determined for the OSC and NOx storage capacity of the NOx storage catalyst and the NOx storage capacity of the NOx storage catalyst is determined by calculating the OSC thereby determined with the first total value for the storage capacity.

For direct determination of the OSC and NOx storage catalyst, in another embodiment of the invention, the internal combustion engine is operated in diagnostic operation in the rich operation mode in a first method step until the NH3 storage capacity of the NH3-SCR catalyst has been at least largely depleted by uptake of $NH_3$ formed in rich operating mode on the NH3-forming catalyst and introduced into the NH3-SCR catalyst with the exhaust gas, and the NOx storage catalyst is at least largely freed of (reversibly) stored $NO_x$ and $O_2$ and in a second method step, which follows this directly the internal combustion engine operation is switched to lean operating mode and the OSC of the NOx storage catalyst is determined from the time lag between the second signal of the first exhaust gas sensor which indicates the change from rich to lean operation and the second signal of the second exhaust gas sensor indicating a change from rich to lean operation.

In another embodiment of the invention, to determine the second storage capacity total value, the internal combustion engine is operated in the rich operating mode in a first method step in diagnostic operation until the NH3 storage capacity of the NH3-SCR, catalyst is at least largely depleted by uptake of $NH_3$ formed on the NH3-forming catalyst during the rich operating mode and introduced into the NH3-SCR catalyst together with the exhaust gas, and the NOx storage catalyst is at least largely freed of (reversibly) stored $NO_x$ and $O_2$ and in a second method step, which follows the first one directly, there is a change in the operation of the internal combustion engine from the rich operating mode to the lean operating mode, and in a third method step, the internal combustion engine is operated in the lean operating mode until the NOx storage capacity of the NOx storage catalyst has been at least largely depleted by the storage of $NO_x$ introduced into the NOx storage catalyst together with the exhaust gas. Then the second storage capacity total value is determined from the first signals of the first and second exhaust gas sensors integrated over the duration of the third method step.

To determine the first total value for the storage capacity, in another embodiment of the invention, starting from lean operation of the internal combustion engine with the NOx storage capacity of the NOx storage catalyst at least approximately depleted, the operation of the internal combustion engine is switched to the rich operating mode and the rich operating mode is maintained until the second signal of the second exhaust gas sensor indicates a switch from lean to rich. The first total value for the storage capacity is then determined from the time lag between the second signal of the first exhaust gas sensor indicating the switch from lean to rich operation and the second signal of the second exhaust gas sensor indicating the switch from lean to rich operation.

In another embodiment of the method, to determine the first total value for the storage capacity, a release of NOx desorbed in unreduced form from the NOx storage catalyst, this release taking place in conjunction with the switch in operation of the internal combustion engine from the lean operating mode to the rich operating mode, is taken into account by summary detection of the first signal of the second exhaust gas sensor, in particular when the NOx storage capacity of the NOx storage catalyst is depleted to a relatively great extent due to the long-term operation of the internal combustion engine in the lean operating mode. For example, desorption of stored $NO_x$ may occur when there is a switch to the rich operating mode, wherein the desorbed nitrogen oxides are discharged from the NOx storage catalyst in unreduced form and therefore without consumption of reducing agent. The consumption of reducing agent for regeneration of the NOx storage catalyst is thus reduced, which is why the period of time until the second signal of the second exhaust gas sensor indicates a switch from lean operation to rich operation is reduced. In such a case, the determination of the NOx storage capacity of the NOx storage catalyst based only on the period of time up to this switch in the sensor signal is subject to errors in such a case. However, this error can be corrected due to the integral detection of the NOx that is desorbed in unreduced form by means of the first signal of the second exhaust gas sensor. The accuracy of the NOx storage capacity of the NOx storage catalyst and/or of the second storage capacity total value thereby ascertained is therefore of interest.

It is thus provided according to the invention that, in the lean and rich operating modes, the internal combustion engine is operated outside of diagnostic operation in a switch from alternating operating phases, wherein a respective phase in the rich operating mode is then terminated at the latest when the amount of NH3 stored in the NH3-SCR storage catalyst has reached a predefinable threshold value, which is lower than the NH3 storage capacity of the NH3-SCR catalyst. This prevents any leakage of NH3 from occurring on the NH3-SCR catalyst during the rich operating mode; that would cause unwanted formation of nitrous oxide due to a reduction of the $NH_3$ reaching the downstream NOx storage catalyst, if it is found that the amount of $NH_3$ stored in the NH3-SCR catalyst has reached the threshold value, then it is preferably provided that the regeneration of the NOx storage catalyst is terminated by switching to lean operation when it still has some $NO_x$ stored in it and thus has not yet completely regenerated.

Additional advantages, features and details of the invention are derived from the following description of preferred exemplary embodiments as well as on the basis of the drawings. The features and combinations of features mentioned in the description above as well as those mentioned below in the descriptions of the figures and/or the features and combinations of features shown only in the figures can be used not only in the respective combination indicated but also in other combinations or alone without going, beyond the scope of the invention.

DETAILED DESCRIPTION OF THE DRAWINGS

Figure 1:
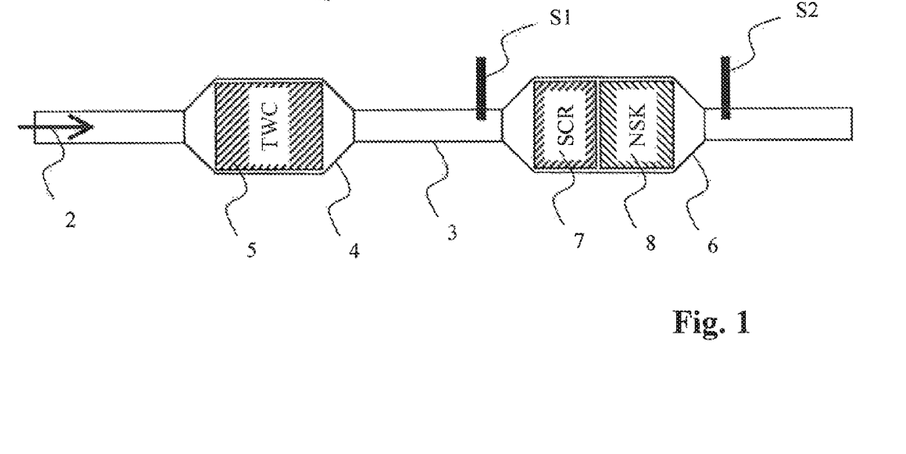
FIG. 1 shows a schematic block diagram of an exhaust gas purification system according to the invention.

FIG. 1 shows a rough schematic diagram of an exhaust gas purification system 1 of an internal combustion engine (not shown) of a motor vehicle. The internal combustion engine can be operated both with an air excess in lean operating mode and with an air deficiency in a rich operating mode. In the present case, the internal combustion engine is designed as a direct injection gasoline engine with external ignition. However, an embodiment as a diesel engine with compression ignition is also possible. Exhaust gas from the internal combustion engine flows into an exhaust gas line 3 according to a direction of flow indicated by an arrow 2. A NH3-forming catalyst 5, a first exhaust gas sensor S1, a NH3-SCR catalyst 7, a NOx storage catalyst 8 and a second exhaust gas sensor S2 are arranged in the exhaust gas line 3, one after the other, in the direction of flow of the exhaust gas.

The NH3-forming catalyst 5 is arranged in a separate housing 4 and is capable of forming $NH_3$ under reducing conditions, i.e., at a lambda value of $\lambda<1$ for the exhaust gas flowing into it, by reducing at least a partial quantity of $NO_x$ contained in the exhaust gas to $NH_3$. Most of the $NO_x$ not reduced to $NH_3$ is reduced to nitrogen ($N_2$). The NH3-forming catalyst 5 in the present case is designed as a three-way catalyst (TWC) in a honeycomb form with a storage capacity for oxygen ($O_2$) and has a corresponding coating containing cerium oxide in particular. The coating also has finely dispersed noble metals of the platinum group which are mainly responsible for the catalytic effect of the NH3-forming catalyst 5. The NH3-forming catalyst 5 may have a coating that is optimized in this regard to increase the $NH_3$ yield.

The NH3-SCR catalyst 7 is preferably also designed as a coated honeycomb body. The catalyst coating material can catalyze a selective continuous reduction of $NO_x$ by means of stored and/or supplied $NH_3$ as a selective NOx-reducing agent under oxidizing conditions, i.e., at a lambda value of $\lambda>1$ for the exhaust gas flowing into it continuous reduction by means of stored and/or supplied $NH_3$. Primarily $N_2$ is formed as the reduction product. An iron or copper-containing zeolite is preferred as the catalyst material. The honeycomb body as the carrier of the catalyst coating material preferably has continuous open flow channels. However, the honeycomb body may also be designed as a particle filter with inlet channels that are open on the inlet side and closed at the end and outlet channels that are closed at the inlet and open at the end outlet channels adjacent to the inlet channels. The channel walls are porous and serve to filter out particles contained in the exhaust gas. In such a case, the catalyst coating material on the raw crude gas side, i.e., on the channel walls of the inlet channels and/or on the clean gas side, i.e., on the channel walls of the outlet channels may be applied there. However, the NH3-SCR catalyst 7 may also be designed as an uncoated so-called solid catalyst in a honeycomb design. In each case the NH3-SCR catalyst 7 has a more or less highly developed capacity for storage of $NH_3$ depending on its temperature.

The NOx storage catalyst 8 in the present case is also designed as a coated honeycomb body. The coating has the ability to store $NO_x$ flowing into the NOx storage catalyst with the exhaust gas under oxidizing conditions and thereby remove it from the exhaust gas. For this purpose the coating typically contains basic materials of the alkaline and/or alkaline earth group, such as barium, for example, and also finely dispersed noble metals of the platinum group. Furthermore, the NOx storage catalyst 8 and/or its coating has, in contrast with the NH3-SCR catalyst, an oxygen storage capacity. With increasing depletion of the NOx storage capacity, the capacity to store $NO_x$ also declines. However, regeneration may also take place by the fact that an exhaust gas which has a reducing effect, i.e., an exhaust gas having a lambda value of λ<1 is supplied occasionally to the NOx storage catalyst 8. To do so, the internal combustion engine is operated in the rich operating mode in which stored $NO_x$ is released again and is mostly reacted with reducing constituents contained in the exhaust gas to form $N_2$.

The NH3-SCR catalyst 7 and the NOx storage catalyst 8 are arranged directly following one another in a common housing 6 in the present case. "Directly following one another" here means that there are no other active cleaning components between the catalysts 7 and 8, nor is there an exhaust gas sensor. Typically the catalysts 7, 8 are kept apart from one another by a small gap in the millimeter range or the centimeter range. However, the NH3-SCR catalyst 7 and the NOx storage catalyst 8 may also be formed by adjacent coatings on a common carrier.

A first exhaust gas sensor S1 is arranged in the exhaust gas purification system 1 and a second exhaust gas sensor S2 is arranged at the output end of the NOx storage catalyst 8 downstream from the NH3-forming catalyst 5 and at the input end of the NH3-SCR catalyst 7. NOx sensors are characteristically used as the exhaust gas sensors S1, S2. In the present case, these are NOx sensors, which supply a signal that correlates with the NOx concentration in the exhaust gas as well as a lambda signal. The lambda signal may be a binary lambda signal and/or a linear, i.e., steady lambda signal. The exhaust gas sensors S1 and S2 may be of the same design, but it is also possible to use an exhaust gas sensor with a steady lambda signal as the first exhaust gas sensor S1 and an exhaust gas sensor with a jump characteristic with respect to the lambda signal as the second exhaust gas sensor S2 or vice versa. The exhaust gas sensors S1, S2 are preferably designed according to a two-chamber measurement principle. Thus, in implementation of the exhaust gas sensors S1, S2, at least two output signals are available and can be evaluated in parallel by a single corresponding NOx sensor for each exhaust gas sensor S1, S2. The exhaust gas sensors S1, S2 are therefore connected to an evaluation and control unit, which is not shown here.

Typically an output signal corresponding at least approximately to a signal generated by a concentration of $NO_x$ in the exhaust as that is of the same size is generated by $NH_3$ present in the exhaust gas. In general, however, $NH_3$ and $NO_x$ are not present in the exhaust gas at the same time, which is why the exhaust gas sensors S1, S2 used in the present case deliver a signal in addition to the signal that correlates with the lambda value of the exhaust gas and this additional signal correlates either with the NOx concentration or with the NH3 concentration in the exhaust gas. The signal of the first and second exhaust gas sensors that correlates with the NOx concentration or the NH3 concentration in the exhaust gas is referred to below as the first signal, and the signal of the exhaust gas sensors S1, S2 that correlates with the lambda value of the exhaust gas is referred to below as the second signal.

In normal operation, the internal combustion engine is operated alternately with an air excess in lean operating mode and with an air deficiency in rich operating mode. During the lean operating mode, any reducing constituents such as CO and HC present in the exhaust gas are oxidized by oxidation in the NH3-forming catalyst 5 and are thus removed from the exhaust gas. However, $NO_x$ contained in the exhaust gas cannot be removed by the NH3-forming catalyst 5. These oxides enter the NH3-SCR catalyst 7, in which they are selectively reduced with the previously stored $NH_3$ if the NH3-SCR catalyst 7 contains stored $NH_3$. Incorporation of $NH_3$ into the NH3-SCR catalyst 7 is described in greater detail below. If the NH3-SCR catalyst 7 does not contain any stored $NH_3$, for example, because the supply of stored $NH_3$ has been depleted, then the NOx present in the exhaust gas will continue to enter the NOx storage catalyst 8, where the nitrogen oxides will be removed from the exhaust gas by absorption and/or storage. In this way, the internal combustion engine can be operated in the consumption-sparing lean operating mode for a relatively long period of time, i.e., up to a few minutes, without emitting any pollutants to any mentionable extent to the environment.

However, in lean operating mode, not only is NOx that has entered the NOx storage catalyst 8 stored, but also a certain amount of oxygen ($O_2$), although small, contained in the exhaust gas is also stored there. However, the storage capacity (OSC) for $O_2$ is limited, like the storage capacity for $NO_x$. If the NOx storage capacity of the NOx storage catalyst 8 is depleted to a certain extent, then $NO_x$ contained in the exhaust gas cannot be absorbed completely and there is a more or less pronounced NOx leakage. If this is detected by analysis of the first signal of the second exhaust gas sensor S2, then the internal combustion engine is typically switched to the rich operating mode. In the rich operating mode, an engine lambda value can be adjusted by varying the amount of combustion air and/or the amount of fuel supplied from about 0.75 to 0.95.

In the rich operating mode, $NO_x$ contained in the exhaust gas is reduced $N_2$, in the NH3-forming catalyst 5 by reduction with reducing constituents contained in the exhaust gas, but is also reduced to $NH_3$ to a substantial extent. $NH_3$ formed in this way is input into the NH3-SCR catalyst 7 with the exhaust gas and is absorbed there and/or stored there and is thus removed from the exhaust gas. Reducing constituents still present in the exhaust gas then enter the NOx storage catalyst 8 and reduce the stored NOx there. Therefore, the NOx uptake capacity of the NOx storage catalyst 8 is restored and thus the NOx storage catalyst 8 is regenerated. At the same time, the oxygen storage of the NOx storage catalyst 8 is emptied by reaction of the stored $O_2$ with the reducing exhaust gas constituents. The thoroughness of regeneration of the NOx storage catalyst 8 can be determined by detecting and analyzing the second signal of the second exhaust gas sensor S2. If the exhaust gas lambda value detected by the second exhaust gas sensor S2 drops to a level of less than one, then reducing exhaust gas constituents will pass through the NOx storage catalyst 8. Stored $O_2$ and stored $NO_x$ are then at least approximately completely removed from the NOx storage catalyst 8. In this case, the regeneration is regarded as complete or at least sufficient, and operation of the internal combustion engine is switched back to the lean operating mode at this point in time at the latest.

The NH3 storage capacity of the NH3-SCR catalyst 7 is also limited and also declines with a drop in temperature. In particular at elevated exhaust gas temperatures, the case may therefore occur that the amount of $NH_3$ introduced into the NH3-SCR catalyst 7 during rich operation of the internal combustion engine comes close to its uptake capacity or even exceeds it. This may result in leakage of $NH_3$, so that breakthrough $NH_3$ then enters the NOx storage catalyst 8. In particular when regeneration of the NOx storage catalyst 8 is not yet concluded, $NH_3$ entering the NOx storage catalyst 8 can be oxidized there to nitrous oxide ($N_2O$) and can thus enter the environment. This is undesirable because of the climate damaging effect of nitrous oxide. Formation of nitrous oxide may also occur when $NH_3$ is desorbed thermally because of a rapid rise in temperature in the lean operating mode when the storage amount of $NH_3$ in the NH3-SCR catalyst 7 is high and the $NH_3$ is introduced into the NOx storage catalyst 8. Therefore, in the present case, it is provided that the amount of $NH_3$ formed in the NH3-forming catalyst 5 and/or the duration of the rich operating mode is/are adapted to the storage capacity of the NH3-SCR catalyst 7. To do so, the rich operating mode is terminated when it is found that the amount of $NH_3$ formed in the NH3-forming catalyst 5 has reached a level that is lower than the $NH_3$ storage capacity of the NH3-SCR catalyst 7 by a preselectable amount. The point for switching from rich operating mode to lean operating mode is determined in the present case by the analysis and control unit. Stored characteristic lines, which indicate the formation of $NH_3$ on the NH3-forming catalyst 5 and the $NH_3$ storage capacity of the NH3-SCR catalyst 7 as a function of the respective operating conditions, are preferably used for this purpose. A change to the lean operating mode is preferably made when the amount of $NH_3$ formed has reached a preselectable threshold value, which is lower than the $NH_3$ storage capacity of the NH3-SCR catalyst 7 or when a reducing agent breakthrough is detected by means of the second exhaust gas sensor S2, depending on which event occurs sooner.

Since the $NH_3$ storage capacity of the NH3-SCR catalyst 7 may be subject to an age-related decline, it is provided in the present case that the $NH_3$ storage capacity of the NH3-SCR catalyst 7 will be determined occasionally, for example, after the elapse of a respective predetermined or predeterminable distance of travel of the motor vehicle. For this purpose, it is preferable to switch to a diagnostic operation, which is described in greater detail below, when approximately constant and predetermined or predeterminable operating conditions prevail.

In diagnostic operation, the $NH_3$ storage capacity of the NH3-SCR catalyst 7, the oxygen storage capacity of the NOx storage catalyst 8 and optionally the NOx storage capacity of the NOx storage catalyst 8 are determined in directly successive operating phases of the internal combustion engine with lean operating mode and with rich operating mode by analysis of the signals of the first and second exhaust gas sensors. This procedure is explained below with reference to the time characteristics of signals of the first exhaust gas sensor S1 and of the second exhaust gas sensor S2, which are diagrammed schematically in FIGS. 1 to 4. The time curves are time-corrected inasmuch as an exhaust gas transit time of the exhaust gas flowing out of the exhaust gas outlet of the internal combustion engine to the installation site of the first exhaust gas sensor S1 and an exhaust gas transit time from the first exhaust gas sensor S1 to the installation site of the second exhaust gas sensor S2 are not taken into account.

In the present case, the diagnostic operation is started with operation of the internal combustion engine in the rich operating mode. The rich operating mode is maintained as long as the $NH_3$ storage capacity of the NH3-SCR catalyst 7 is at least largely depleted due to uptake of $NH_3$ formed on the NH3-forming catalyst 5 in the rich operating mode and introduced into the NH3-SCR catalyst 7 with the exhaust gas, and the NOx storage catalyst 8 has been at least largely freed of the stored $NO_x$ and $O_2$. This is regarded as given, when the first signal of the second exhaust gas sensor S2 corresponds at least approximately to the first signal of the first exhaust gas sensor S1, and furthermore, the second signal of the second exhaust gas sensor S2 indicates an exhaust gas lambda value of less than one, i.e., a reducing exhaust gas composition. In this case, the NH3-SCR catalyst 7 is at least approximately saturated with respect to the stored $NH_3$. It is no longer possible to remove from the exhaust gas the $NH_3$ entering the NH3-SCR catalyst 7 with the exhaust gas by storage, and the $NH_3$ content of the exhaust gas downstream from the NH3-SCR catalyst 7 and also downstream from the NOx storage catalyst 8 is at least approximately as great as that at the inlet end of the NH3-SCR catalyst 7. In addition, because of the reducing exhaust gas lambda value downstream from the NOx storage catalyst 8, it is certain that the oxygen store of the NOx storage catalyst 8 have been emptied, and that stored $NO_x$ has been removed. The exhaust gas lambda values upstream from the NH3-SCR catalyst 7 and downstream from the NOx storage catalyst 8, i.e., the second signals of the first and second exhaust gas sensors are thus also approximately the equal and correspond to the engine lambda value that is represented as $\lambda_M$. This state is characterized in the time chart in FIG. 2 by the superimposed lines for the engine lambda value $\lambda_M$ (solid line), for the second signal $\lambda_{S1}$ of the first exhaust gas sensor S1 (dashed line) and the second signal $\lambda_{S2}$ of the second exhaust gas sensor S2 (dotted line) in the time range from t02 to t12.

Figure 2:
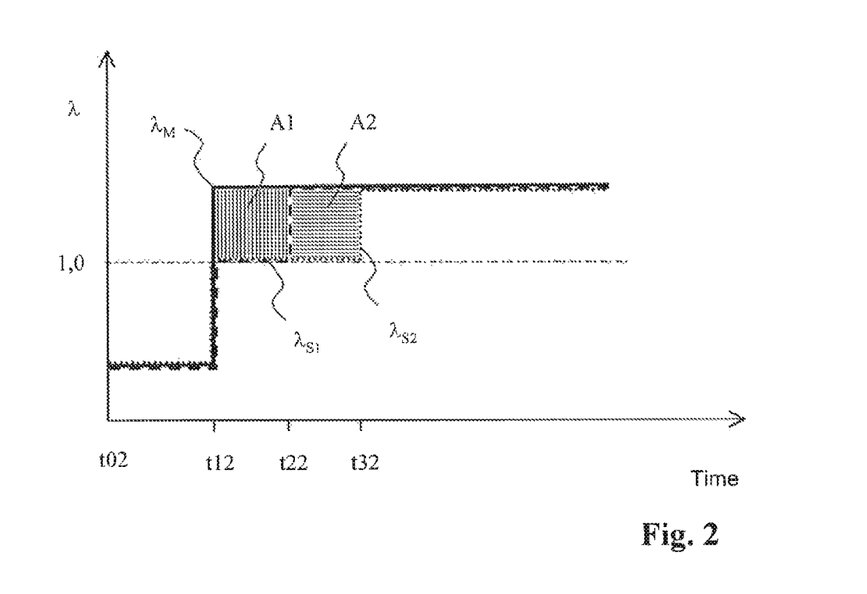
FIG. 2 shows a first time chart with schematically plotted lambda curves of exhaust gas sensors of the exhaust gas purification system according to FIG. 1 in a switch from rich operation to lean operation.

After reaching a stable state, at point in time t12, operation of the internal combustion engine is switched to the lean operating mode, preferably very rapidly. This is characterized by the perpendicular increase in the solid line curve $\lambda_M$. Lean exhaust gas containing an excess of oxygen is thus supplied to the NH3-forming catalyst 5 as of t12. First, the oxygen storage of the NH3-forming catalyst 5, which is depleted in the preceding rich operating phase, is filled up again. For this reason the lean exhaust gas composition does not break through immediately to the first exhaust gas sensor S1 and its second signal $\lambda_{S1}$ initially remains at a lambda value of 1.0. Thus, since an exhaust gas having an exhaust gas lambda value of 1.0 is supplied to the NH3-SCR catalyst 7 and the NOx storage catalyst 8, the second signal $\lambda_{S2}$ of the second exhaust gas sensor S1 also shows this value. If the oxygen storage of the NH3-forming catalyst 5 is full at the point in time t22, then the second signal $\lambda_{S1}$ of the first exhaust gas sensor S1 jumps to the engine lambda value $\lambda_M$. Exhaust gas, which is now lean and flows into the NH3-SCR catalyst 7, thus reaches the NOx storage catalyst 8 without any change with respect to the lambda value. As long as oxygen contained in the exhaust gas is stored in the NOx storage catalyst 8 and its oxygen storage capacity is not depleted, the second signal $\lambda_{S2}$ of the second exhaust gas sensor S2 will still remain at an exhaust gas lambda value of 1.0. Only when the oxygen storage of the NOx storage catalyst 8 has also been filled up at the point in time t32 does the second signal $\lambda_{S2}$ of the second exhaust gas sensor S2 also jump to the engine lambda value $\lambda_M$. The amount of oxygen introduced into the NOx storage catalyst 8 with the exhaust gas in the period of time between t22 and t32 has thus been consumed to fill up the oxygen storage of the NOx storage catalyst 8. The oxygen concentration in the exhaust gas and the exhaust gas mass flow are present and/or can be determined on the basis of the data present and/or determined in the evaluation and control unit, so that together with these values and the measured time lag t32-t22 between the jump in the second signal $\lambda_{S1}$ of the first exhaust gas sensor S1 and the jump in the second signal of the second exhaust gas sensor S2 to the engine lambda value $\lambda_M$, the oxygen storage capacity (OSC) of the NOx storage catalyst 8 can be determined.

The oxygen storage capacity of the NOx storage catalyst 8 thus also correlates with the area A2 shown with horizontal dashed lines in FIG. 2. This can also be detected and used to determine the oxygen storage capacity of the NOx storage catalyst 8. Similarly the area A1 shown with dotted lines vertically in FIG. 2 can be used to determine the oxygen storage capacity of the NH3-forming catalyst 5. In this way, the NH3-forming catalyst 5 can also be diagnosed with respect to a change in its oxygen storage capacity due to age.

Starting from a rich operating mode of the internal combustion engine, which is maintained until the $NH_3$ storage capacity of the NH3-SCR catalyst 7 has been largely depleted by uptake of $NH_3$ formed on the NH3-forming catalyst 5 during the rich operating mode and introduced into the NH3-SCR catalyst 7 with the exhaust gas, and the NOx storage catalyst 8 has been at least mostly freed of stored $NO_x$ and $O_2$, a total value for the NOx storage capacity of the NOx storage catalyst 8 and the $NH_3$ storage capacity of the NH3-SCR catalyst 7 can also be determined after a change to the lean operating mode. This is explained in greater detail below with reference to the time chart in FIG. 3.

Figure 3:
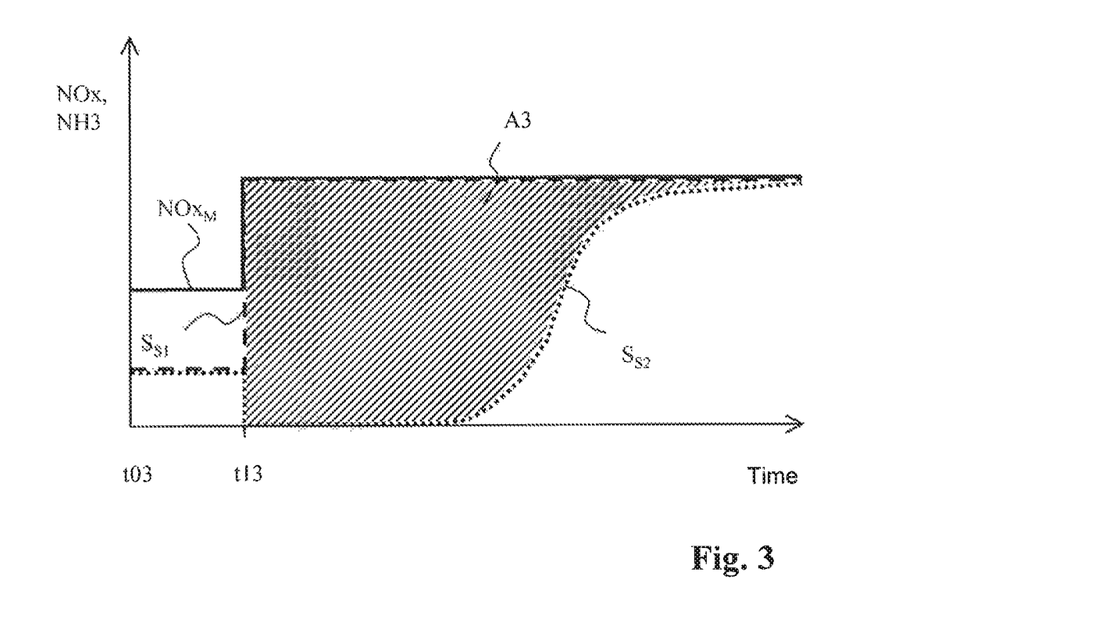
FIG. 3 shows a second time chart with schematically plotted signal curves of exhaust gas sensors of the exhaust gas purification system according to FIG. 1 in a switch from rich operation to lean operation.

The time chart in FIG. 3 shows schematically the curves for the transit time curves of the transit time-corrected first signals of the first exhaust gas sensor S1 and of the second exhaust gas sensor S2 together with the NOx crude emission of the internal combustion engine diagrammed schematically. The NOx crude emission of the internal combustion engine is represented by a solid line labeled as $NOx_M$. The first signal of the first exhaust gas sensor S1 is represented by a dashed line labeled as $S_{S1}$ and the first signal of the second exhaust gas sensor S2 is represented by a dotted line labeled as $S_{S2}$.

The NOx emitted by the internal combustion engine in the rich operating mode is not completely reduced to $NH_3$ on the NH3-forming catalyst 5 so the first signal $S_{S1}$ of the first exhaust gas sensor S1 is below the NOx crude emission $NOx_M$ of the internal combustion engine and in this case is to be interpreted as correlating with the $NH_3$ concentration of the exhaust gas. Owing to the saturation of the NH3-SCR catalyst 7 with stored $NH_3$, $NH_3$ contained in the exhaust gas penetrates through the NH3-SCR catalyst 7 and passes unchanged through the NOx storage catalyst 8, which has been depleted of $NO_x$ and $O_2$. Therefore, the first signal $S_{S2}$ of the second exhaust gas sensor S2 corresponds initially to that of the first exhaust gas sensor S1. If operation is switched to the lean operating mode at the point in time t13, when conditions have been stable over time, then the NOx crude emission $NOx_M$ of the internal combustion engine will typically jump to a higher value. NOx contained in the exhaust gas reaches the first exhaust gas sensor S1 without being reduced, which is why the first signal $S_{S1}$ of the first exhaust gas sensor S1 also rises to this signal level, which is now to be interpreted as NOx. $NO_x$ contained in the exhaust gas reaches the NH3-SCR catalyst 7 in an essentially unchanged amount, and is reduced there at least mostly to $N_2$ by reaction with stored $NH_3$. Thus, an exhaust gas that is free of NOx initially reaches the NOx storage catalyst 8. The first signal $S_{S2}$ of the second exhaust gas sensor S2 therefore drops at least approximately to zero at the point in time t13. Even if the $NH_3$ stored in the NH3-SCR catalyst 7 has been consumed by reaction with incoming $NO_x$ the first signal $S_{S2}$ of the second exhaust gas sensor S2 initially remains at zero because $NO_x$ entering the NOx storage catalyst 8 is stored there and cannot reach the second exhaust gas sensor S2. Only with gradual depletion of the NOx storage capacity of the NOx storage catalyst 8 does the $NO_x$ contained in the exhaust gas at the output end of the NOx storage catalyst 8 then reach the second exhaust gas sensor S2. The first signal $S_{S2}$ of the second exhaust gas sensor S2 therefore increases only after a generous amount of time.

Only when NH3 stored in the NH3 storage catalyst 7 has been used up, and furthermore, the NOx storage capacity of the NOx storage catalyst 8 is depleted does the first signal $S_{S2}$ of the second exhaust gas sensor S2 reach a level corresponding to that of the first exhaust gas sensor S1 and thus to the NOx crude emission $NOx_M$ of the internal combustion engine. The area A3, shown with dashed lines in FIG. 3, therefore represents a measure of the total amount of NOx removed from the exhaust gas by reaction or storage after the change to lean operating mode which is carried out at t13. By summary detection of the first signal $S_{S2}$ of the second exhaust gas sensor S2 after the point in time t13 up to a point in time of a preselectable minor deviation from the NOx crude emission $NOx_M$ of the internal combustion engine and offsetting with the amount of NOx emitted by the internal combustion engine in this period of time, which is known from stored engine characteristics maps and/or from an integral value of the first signal $S_{S1}$ of the first exhaust gas sensor S1 determined for this period of time, a total value for the storage capacity of the NH3-SCR catalyst 7 and the NOx storage capacity of the NOx storage catalyst 8 can therefore be determined.

Figure 4:
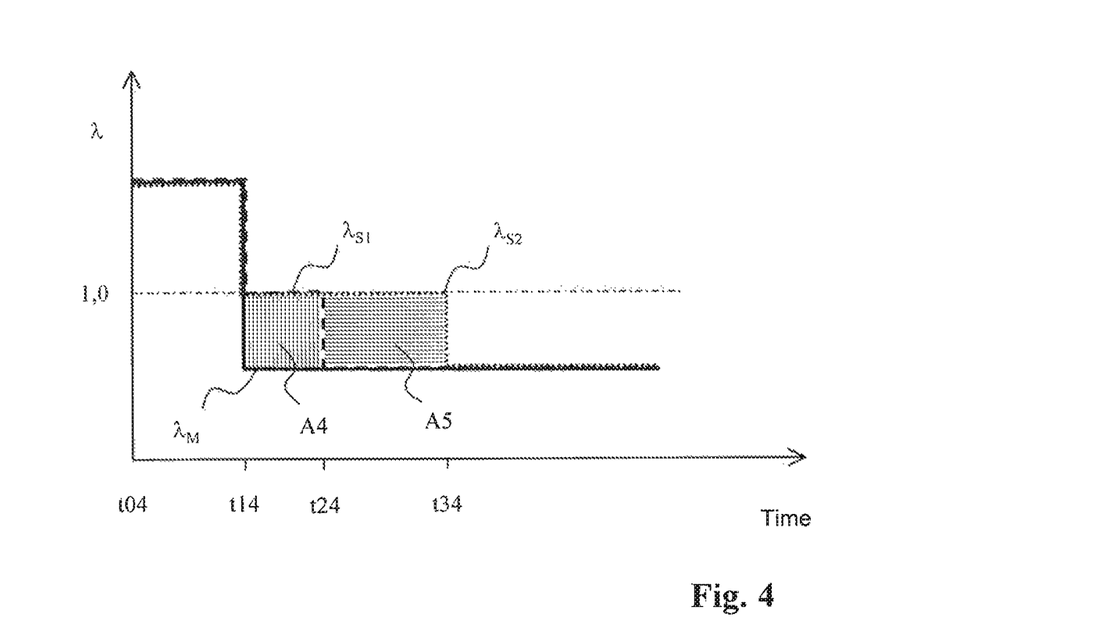
FIG. 4 shows a third time chart with schematically plotted lambda curves of exhaust gas sensors of the exhaust gas purification system according to FIG. 1 in a switch from rich operation to lean operation.

Determination of the storage capacity total value for the oxygen storage capacity and the NOx storage capacity of the NOx storage catalyst 8, this determination being performed in another method step of the diagnostic operation, is explained in greater detail below with reference to FIG. 4. Like FIG. 2, FIG. 4 shows schematically time curves of the lambda value $\lambda_M$ of the engine (solid line) as well as time curves of the second signal $\lambda_{S1}$ (dashed line) of the first exhaust gas sensor S1 and of the second signal $\lambda_{S2}$ (dotted line) of the second exhaust gas sensor S2.

To determine the storage capacity total value for the oxygen storage capacity and the NOx storage capacity of the NOx storage catalyst 8, a state in the lean operating mode of the internal combustion engine is assumed in which the NH3-SCR catalyst 7 is at least approximately completely free of stored $NH_3$ and the NOx storage capacity of the NOx storage catalyst 8 is at least approximately completely depleted, i.e., the NOx storage catalyst 8 is at least approximately saturated with respect to stored $NO_x$. Because of the long-lasting lean operation which is required here accordingly, the oxygen stores of the NH3-forming catalyst 5 and of the NOx storage catalyst 8 are also filled. In this state the second signals $\lambda_{S1}$, $\lambda_{S2}$ emitted by the exhaust gas sensors S1, S2 correspond to the lambda value $\lambda_M$ of the engine, which is why the corresponding lines in FIG. 4 are superimposed on one another starting from the point in time t04.

When there are stable conditions over time, the internal combustion engine is switched to rich operating mode at time t14, preferably being switched rapidly, and the lambda value $\lambda_M$ of the engine therefore drops to the set value of less than 1.0. The second signal $\lambda_{S1}$ of the first exhaust gas sensor S1 accordingly drops to a value of only 1.0 because exhaust gas constituents that have a reducing effect entering the NH3-forming catalyst 5 react with stored $O_2$ and are removed from the exhaust gas. For this reason exhaust gas leaving the NH3-forming catalyst 5 and reaching the first exhaust gas sensor S1 is initially at least approximately free of reducing constituents and also does not have an oxygen excess. The exhaust gas which is almost chemically inert reaches the second exhaust gas sensor S2 at least approximately unchanged, which is why its second signal $\lambda_{S2}$ also drops to a value corresponding to an exhaust gas lambda value of 1.0 at a point in time t14, disregarding the exhaust gas transit time.

This state persists until the oxygen store of the NH3-forming catalyst 5 has been emptied at point in time t24. If the oxygen store of the NH3-forming catalyst 5 has been emptied at point in time t24, then reducing constituents thereof are no longer being removed from the exhaust gas and the reducing exhaust gas emitted by the internal combustion engine reaches the first exhaust gas sensor S1 almost unchanged with respect to the lambda value reaches the first exhaust gas sensor S1 and the NH3-SCR catalyst 7. The second signal $\lambda_{S1}$ emitted by the first exhaust gas sensor S1 therefore jumps to the lambda value $\lambda_M$ of the engine at the point in time t24. When the oxygen store of the NH3-forming catalyst 5 has been emptied, it begins to form $NH_3$ by catalytically supported reduction of $NO_x$ present in the exhaust gas. However, this has little or no significant influence on the lambda value of the exhaust gas. $NH_3$ present in the exhaust gas is thus removed from the exhaust gas with the influx entrance into the NH3-SCR catalyst 7 and reducing exhaust gas entering the NOx storage catalyst 8 has an exhaust gas lambda value corresponding at least approximately to the lambda value $\lambda_M$ of the engine. Reducing exhaust gas constituents entering the NOx storage catalyst 8 as of the point in time t24 react with $NO_x$ and $O_2$ stored there. As long as $NO_x$ and $O_2$ stored in the NOx storage catalyst 8 are still available, the second signal $\lambda_{S2}$ emitted by the second exhaust gas sensor S2 remains at a lambda value of 1.0. Only with the emptying of the corresponding store are the reducing exhaust as constituents of the NOx storage catalyst 8 no longer being removed from the exhaust gas and therefore reach the second exhaust gas sensor S2. This is the case at point in time t34 here, which is why the second signal $\lambda_{S2}$ of the second exhaust gas sensor S2 drops to the lambda value $\lambda_M$ of the engine at this point in time.

It follows from the facts described above that reducing constituents present in the exhaust gas emitted by the internal combustion engine are removed from the exhaust gas in the interval of time between t24 and t34 by reaction with $NO_x$ and $O_2$ stored in the NOx storage catalyst 8. Therefore the period of time t34-t24 correlates with the sum of the corresponding storage values. The amount of reducing constituents emitted by the engine in the period of time t34-t24 can be determined by means of engine operating data obtained by the control and analysis unit and/or made available by that unit such as the quantity of intake air, the quantity of fuel consumption, the exhaust gas mass flow and optionally other variables and these variables results can be converted directly to a value for the quantities of $NO_x$ and $O_2$ stored in the NOx storage catalyst 8. Because of the saturation state of the NOx storage catalyst 8 prevailing before switching engine operation to the rich operating mode these values correspond to its storage capacity total value for the oxygen storage capacity and the NOx storage capacity. Therefore from the time lag between the second signal $\lambda_{S1}$ of the first exhaust gas sensor S1 indicating a switch from lean to rich and the second signal $\lambda_{S2}$ of the second exhaust gas sensor S2 indicating a switch from lean to rich, the storage capacity total value for the storage capacity for the total of the oxygen storage capacity and the NOx storage capacity of the nitrogen oxide storage catalyst 8 can be determined from the time lag. As indicated by the preceding discussion and FIG. 4, this total value for the storage capacity can also be determined from the area A5 characterized by horizontal hatching in FIG. 4. Similarly the oxygen storage capacity of the NH3-forming catalyst 5 can also be determined from the area A4 characterized by vertical hatching. By comparison with the oxygen storage capacity of the NH3-forming catalyst 5 which can also be determined above in combination with a change from rich operating mode to lean operating mode, therefore a more reliable estimate for this storage characteristic value can be obtained, for example, by averaging the two results.

In the change from lean operating mode to rich operating mode, which occurs in diagnostic operation, there may be desorption of $NO_x$ stored in the NOx storage catalyst 8, such that desorbing $NO_x$ is discharged from the NOx storage catalyst 8 without being reduced. It is possible to ascertain that the storage capacity total value for the sum of the oxygen storage capacity and the NOx storage capacity of the nitrogen oxide storage catalyst 8 is too low can be determined in such a case by simply analyzing the time lag between the second signal $\lambda_{S1}$ of the first exhaust gas sensor S1 indicating a change from lean to rich and the second signal $\lambda_{S2}$ of the second exhaust gas sensor S2 indicating a change from lean to rich. It is therefore provided in the present case that the amount of $NO_x$ desorbed from the NOx storage catalyst 8 without being reduced can be detected in summary form by integration of the first signal $S_{S2}$ of the second exhaust gas sensor S2 starting, at the point in time t14 up to approximately the point in time t34. The total value thereby determined is added to the total value for the storage capacity determined by analysis of the time lag between the signal $\lambda_{S1}$ of the first exhaust gas sensor S1, indicating a change from lean to rich and the second signal $\lambda_{S2}$ of the second exhaust gas sensor S2, indicating a change from lean to rich. In this way it is possible to avoid an erroneous determination of this storage capacity.

On the one hand, as explained above, the oxygen storage capacity (OSC) of the NOx storage catalyst 8 can be determined with the diagnostic operation according to the invention for the exhaust gas purification system according to FIG. 1. On the other hand, the total value can be determined for the storage capacity for the NOx storage capacity of the NOx storage catalyst 8 and the NH3 storage capacity of the NH3-SCR catalyst 7, as well as the total value for the storage capacity for the sum of the oxygen storage capacity and the NOx storage capacity of the nitrogen oxide storage catalyst 8. If the oxygen storage capacity of the NOx storage catalyst 8 is referred to as $OSC_{NSC}$, and if the total value for the NOx storage capacity of the NOx storage catalyst 8 and the NH3 storage capacity of the NH3-SCR catalyst 7 are referred to as $\Sigma(S_{NOx}+S_{NH3})$ and the total value for the sum of the oxygen storage capacity and the NOx storage capacity of the nitrogen oxide storage catalyst 8 is referred to as $\Sigma(OSC_{NSC}+S_{NOx})$, then the NH3 storage capacity $S_{NH3}$ is obtained by using the following equation:

$$S_{NH3}=OSC_{NSC}-\Sigma(OSC_{NSC}+S_{NOx})+\Sigma(S_{NOx}+S_{NH3}).$$

Thus, the NH3 storage capacity of the NH3-SCR, catalyst 7, which cannot be determined directly and individually, can be determined indirectly by this method for the exhaust gas system 1 according to FIG. 1. This makes is possible for the exhaust gas system 1 to always be operated in such a way that NH3 leakage of the NH3-SCR catalyst and a resulting formation of nitrous oxide on the NOx storage catalyst 8 can be prevented reliably. Furthermore, the NOx storage capacity $S_{NOx}$ of the NOx storage catalyst 8, which also cannot be determined directly and individually from the storage characteristic values determined in diagnostic operation, as explained above, can be determined by the following equation:

$$S_{NOx}=\Sigma(OSC_{NSC}+S_{NOx})-OSC_{NSC}.$$

The NH3-SCR catalyst 7 and the NOx storage catalyst 8 can therefore be monitored and diagnosed continuously and/or at certain intervals with respect to their storage capacity for $NH_3$ and/or $NO_x$. Furthermore, as mentioned above, the oxygen storage capacity of the NH3-forming catalyst 5, as well as the oxygen storage capacity of the NOx storage catalyst 8 can be determined continuously and/or at certain intervals and these catalysts can therefore also be monitored and diagnosed in this regard. Thus, on the whole, comprehensive monitoring and diagnosis of the catalyst 5, 7, 8 of the exhaust gas purification system 1 and therefore operation of the exhaust gas purification system 1 that has been adapted to an age-related exacerbation of the storage characteristic values of these catalysts are made possible on the whole.

The invention claimed is:

1. A method for operating an exhaust gas purification system for purifying exhaust gas of an internal combustion engine, which is operable in a lean operating mode with an air excess and in a rich operating mode with an air deficiency, wherein the exhaust gas purification system has, arranged in a direction of flow of the exhaust gas one after the other:
    an ammonia-forming catalyst which catalyzes at least partial reduction of nitrogen oxide contained in the exhaust gas to ammonia under reducing conditions;
    a first exhaust gas sensor;
    an ammonia-SCR catalyst having a storage capacity for ammonia;
    a nitrogen oxide storage catalyst having a storage capacity for oxygen and a storage capacity for nitrogen oxide, arranged directly downstream from the ammonia-SCR catalyst; and
    a second exhaust gas sensor;
    wherein the first and second exhaust gas sensors each emit a first signal that correlates with a nitrogen oxide content of the exhaust gas and a second signal that correlates with a lambda value of the exhaust gas;
    and comprising the step of determining in diagnostic operation during directly successive operating phases of the internal combustion engine with the lean operating mode and with the rich operating mode that directly follow one another, each of the ammonia storage capacity of the ammonia-SCR catalyst, the oxygen storage capacity of the nitrogen oxide storage catalyst and the nitrogen oxide storage capacity of the nitrogen oxide storage catalyst by analyzing the first and second signals of the first and second exhaust gas sensors.

2. The method according to claim 1, wherein in diagnostic operation, a first storage capacity total value for the oxygen storage capacity and the nitrogen oxide storage capacity of the nitrogen oxide storage catalyst and a second storage capacity total value for the nitrogen oxide storage capacity of the nitrogen oxide storage catalyst and the ammonia storage capacity of the ammonia-SCR catalyst are determined, and the ammonia storage capacity of the ammonia-SCR catalyst is determined by calculating the oxygen storage capacity thereby determined and the first and the second storage capacity total values.

3. The method according to claim 1, wherein in diagnostic operation a first storage capacity total value for the oxygen storage capacity and the nitrogen oxide storage capacity of the nitrogen oxide storage catalyst are determined and the nitrogen oxide storage capacity of the nitrogen oxide storage catalyst is determined by calculating the oxygen storage capacity thereby determined using the first storage capacity total value.

4. The method according to claim 1, wherein in a first method step in diagnostic operation, the internal combustion engine is operated in the rich operating mode until the ammonia storage capacity of the ammonia-SCR catalyst is depleted by uptake of ammonia formed on the ammonia-forming catalyst during the rich operating mode and introduced into the ammonia-SCR catalyst with the exhaust gas, and the nitrogen oxide storage catalyst is at least largely freed of stored nitrogen oxide and oxygen, and in a second method step, which follows the first method step directly, an operation of the internal combustion engine is switched to the lean operating mode, and the oxygen storage capacity of the nitrogen oxide storage catalyst is determined from a time lag between the second signal of the first exhaust gas sensor, indicating a switch from the rich operating mode to the lean operating mode, and the second signal of the second exhaust gas sensor, indicating a switch from the rich operating mode to the lean operating mode.

5. The method according to claim 2, wherein in a first method step in diagnostic operation, the internal combustion engine is operated in the rich operating mode until the ammonia storage capacity of the ammonia-SCR catalyst is depleted by uptake of ammonia formed on the ammonia-forming catalyst during the rich operating mode and introduced into the ammonia-SCR catalyst with the exhaust gas, and the nitrogen oxide storage catalyst is freed of stored nitrogen oxide and oxygen, and in a second method step, which follows the first method step directly, there is a change in an operation of the internal combustion engine to the lean operating mode, and in a third method step the internal combustion engine is operated in the lean operating mode until the nitrogen oxide storage capacity of the nitrogen oxide storage catalyst has been depleted by the storage of nitrogen oxide introduced into the nitrogen oxide storage catalyst with the exhaust gas, and the second storage capacity total value is determined from the first signals of the first and second exhaust gas sensors integrated over a duration of the third method step.

6. The method according to claim 2, wherein in diagnostic operation starting from the lean operating mode of the internal combustion engine with the nitrogen oxide storage capacity of the nitrogen oxide storage catalyst depleted, there is a change in an operation of the internal combustion engine to the rich operating mode, and the rich operating mode is maintained until the second signal of the second exhaust gas sensor indicates a change from the lean operating mode to the rich operating mode, and the first storage capacity total value is determined at least from a time lag between the second signal of the first exhaust gas sensor, indicating a switch from the lean operating mode to the rich operating mode, and the second signal of the second exhaust gas sensor, indicating a switch from the lean operating mode to the rich operating mode.

7. The method according to claim 6, wherein to determine the first storage capacity total value, a release of nitrogen oxide in unreduced form, desorbed from the nitrogen oxide storage catalyst in conjunction with a change in an operation of the internal combustion engine from the lean operating mode to the rich operating mode is taken into account by a summary determination of the first signal of the second exhaust gas sensor.

8. The method according to claim 1, wherein the internal combustion engine is operated outside of diagnostic operation in a change from varying operating phases in the lean operating mode and the rich operating mode, wherein a respective operating phase in the rich operating mode is terminated at a latest when an amount of ammonia stored in the ammonia-SCR catalyst has reached a predefinable threshold value, which is lower than the ammonia storage capacity of the ammonia-SCR catalyst.

9. A method for operating an exhaust gas purification system of an internal combustion engine, wherein the exhaust gas purification system includes sequentially in a direction of flow of an exhaust gas:
- an ammonia-forming catalyst;
- a first exhaust gas sensor;
- an ammonia-SCR catalyst;
- a nitrogen oxide storage catalyst; and
- a second exhaust gas sensor;
- wherein the first and the second exhaust gas sensors each emit a first signal that correlates with a nitrogen oxide content of the exhaust gas and a second signal that correlates with a lambda value of the exhaust gas;

and comprising the step of:
- determining in a diagnostic operation during directly successive operating phases of the internal combustion engine with a lean operating mode with an air excess and with a rich operating mode with an air deficiency that directly follow one another, each of an ammonia storage capacity of the ammonia-SCR catalyst and an oxygen storage capacity of the nitrogen oxide storage catalyst by analyzing the first and the second signals of the first and the second exhaust gas sensors.

* * * * *